INVENTORS.
Sung C. Lee
Paul Palatnick
BY Wooster, Davis & Cifelli
ATTORNEYS.

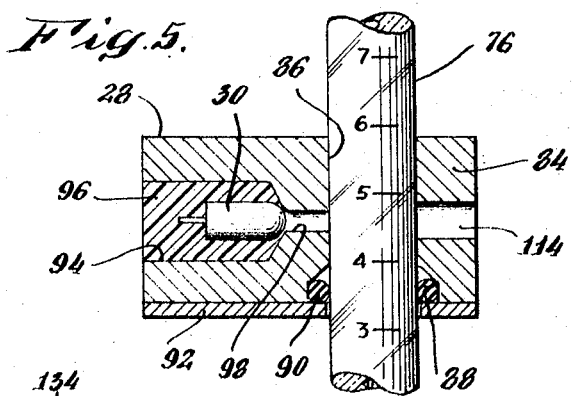
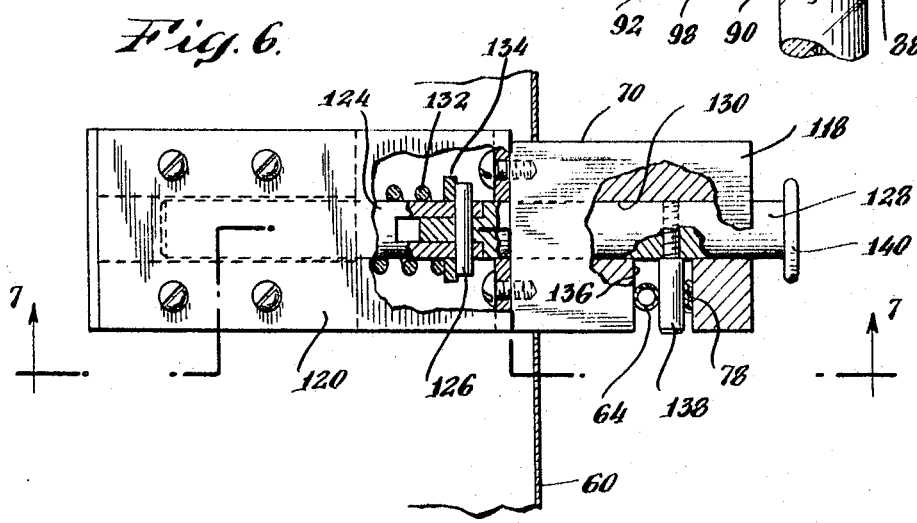
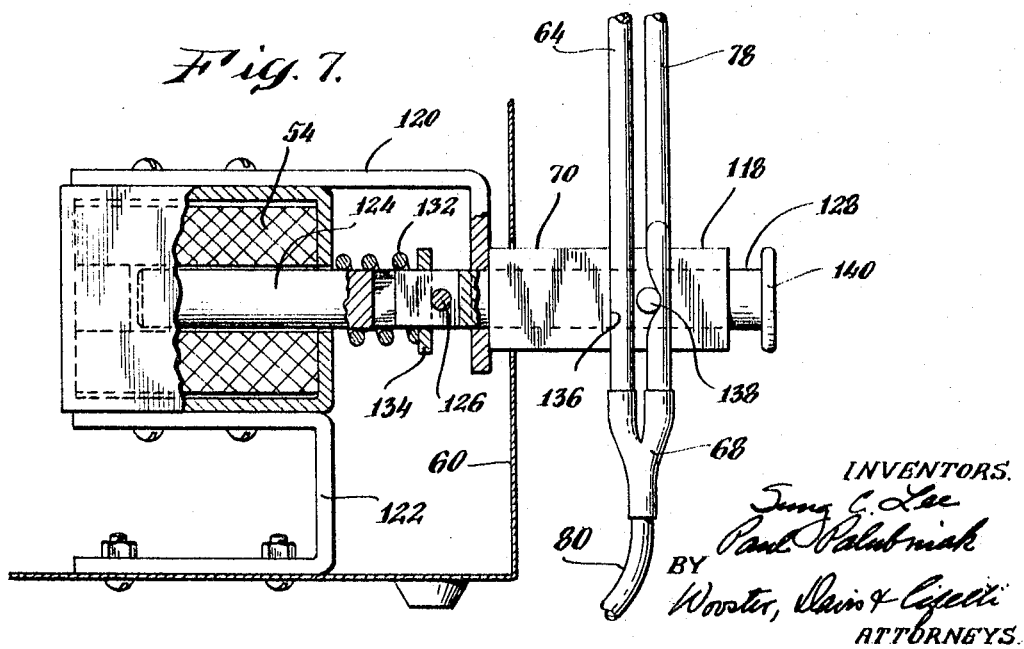

United States Patent Office 3,456,648
Patented July 22, 1969

3,456,648
AUTOMATIC VENOUS INFUSION MONITORING APPARATUS
Sung Chuel Lee, Bridgeport, and Paul Palubniak, Easton, Conn., assignors to LPT Corporation, Bridgeport, Conn., a corporation of Connecticut
Filed May 3, 1967, Ser. No. 635,891
Int. Cl. A61m 5/00; A61b 5/02
U.S. Cl. 128—214                                10 Claims

ABSTRACT OF THE DISCLOSURE

Automatic venous infusion monitoring apparatus. The blood pressure of the patient is checked automatically and periodically during fluid infusion. Whenever the pressure reaches a predetermined critical level, infusion is stopped but is thereafter permitted for short time periods at regular intervals to prevent clotting. When the pressure varies from the critical level, infusion is reestablished.

Background of the invention

The importance of controlling central venous pressure in patients undergoing intravenous infusions is becoming more and more apparent to medical personnel. However, because of the critical shortage of medical personnel at all levels of ability, training, and experience, the continuous monitoring of venous pressure during infusion is often curtailed and, in some instances, completely neglected. While various approaches to this problem have been devised, they are nearly all deficient in some respect. For example, any approach to the problem which requires the presence of medical personnel for each pressure measurement is undesirable. Furthermore, certain mechanical apparatus has been proposed but, in many of these devices, the infusion fluid comes into contact with portions of the apparatus which, accordingly, must be sterilized for each use. It is the primary object of the present invention to overcome these and other disadvantages of the prior art. Other objects are to provide apparatus which automatically supplies the intravenous infusion fluid and monitors the central venous pressure; to provide such apparatus wherein infusion flow is controlled by the central venous pressure; and to provide such apparatus wherein the mechanical and control elements do not come into contact with the infusion fluid and, thus, require no sterilization.

Summary of the invention

The present invention is a fully automatic apparatus which periodically measures a patient's venous pressure during fluid infusion and stops the fluid flow when the pressure rises above or falls below a preselected pressure limit.

Brief description of the drawings

The apparatus of this invention may be best understood by reference to the following description, the appended claims, and the attached drawings wherein:

FIG. 5 is a cross section taken substantially along the line 5—5 of FIG. 4;

FIG. 6 is an enlarged detail of the solenoid valve assembly of this invention, portions thereof being broken away to more clearly illustrate its internal construction; and FIG. 7 is a cross section taken substantially along the line 7—7 of FIG. 6.

Description of the preferred embodiment

Figure 1:
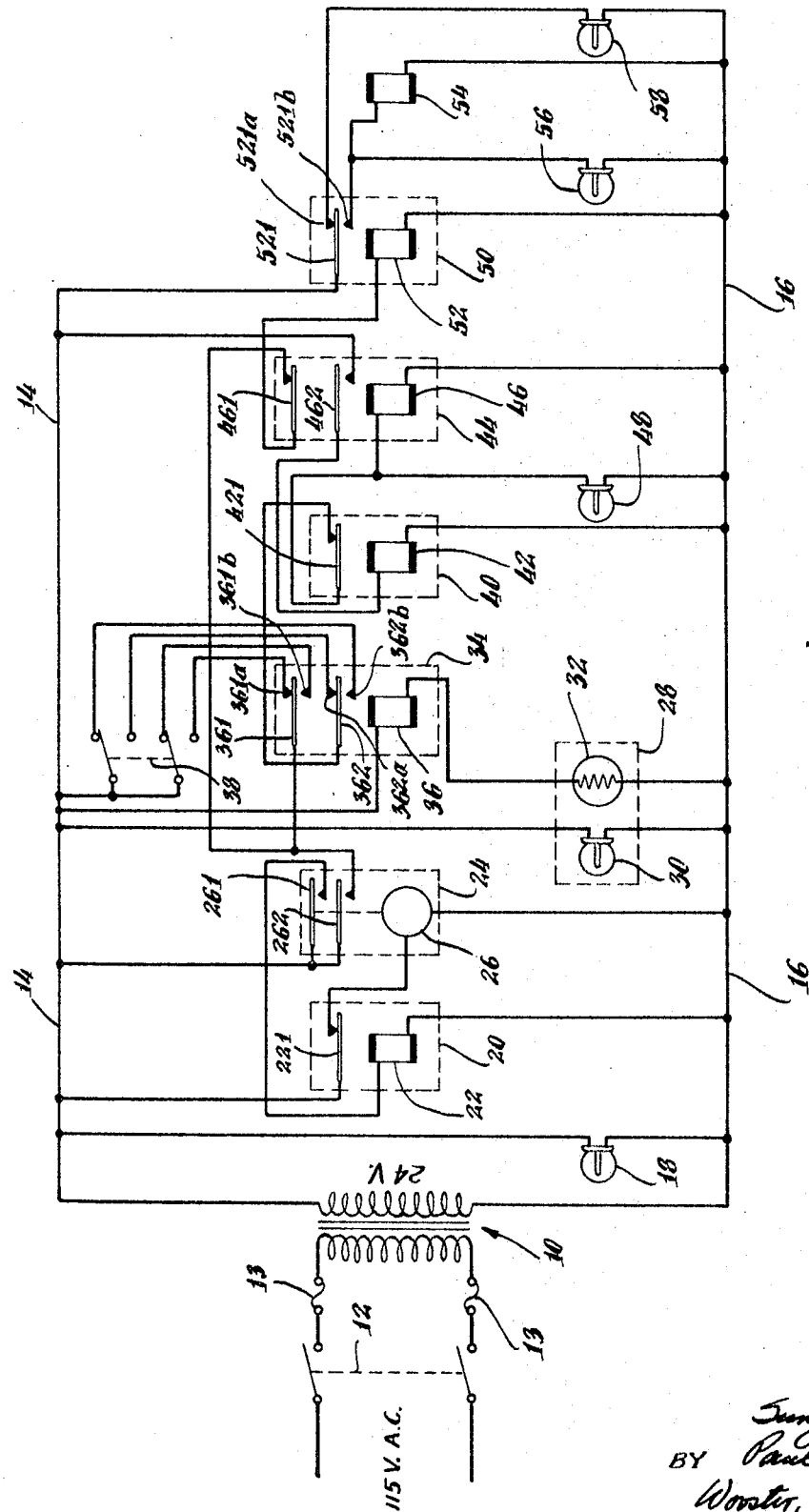
FIG. 1 is a schematic diagram of the electrical circuitry of an apparatus constructed in accordance with this invention.

In the schematic diagram of FIG. 1 there is illustrated a transformer 10 energized from a 115 volt A.C. power supply through a double pole switch 12 and fuses 13. The secondary voltage of 24 volts is applied to conductors 14, 16. Connected directly across these conductors is an indicating lamp 18. A one-hundred-twenty second time delay relay 20 has one end of its relay coil 22 connected to conductor 16 and includes a normally closed contact 221 with its movable member connected to conductor 14.

A 0–3 hour cycle timer 24 includes a motor controlled timing mechanism 26 connected between contacts 221 and conductor 16 to selectively close a pair of normally open contacts 261, 262. The movable members of both contacts are connected to conductor 14 and the stationary member of contact 261 is connected to relay coil 22.

A sensor head 28 is provided which includes a lamp 30 connected between conductors 14, 16 and a light sensitive resistor 32. Resistor 32 is connected in series with the relay coil 36 of a 12 volt reed relay 34 across conductors 14, 16. Relay coil 36 controls a contact arm 361 which is normally closed against a fixed contact 361a but may be closed against a fixed contact 361b. A second movable contact arm 362 is normally closed against a fixed contact 362a but may be closed against a fixed contact 362b. Contacts 361a, 362a are connected to one pair and contacts 361b and 362b to the other pair of fixed contacts of a double pole, double throw selector switch 38 having its movable arms connected to conductor 14.

A time delay relay 40 has one end of its relay coil 42 connected to conductor 16. Preferably, this relay has a time delay which is adjustable to a maximum of approximately 5 seconds. The relay coil operates a normally closed contact 421. The fixed member of contact 421 is connected to contact arm 362 of relay 34. A ninety second time delay relay 44 includes a relay coil 46 which is connected between the conductor 16 and the movable contact arm 421 of relay 40. The relay coil 46 controls normally closed contacts 461 and normally open contacts 462. Contacts 462 are connected between conductor 14 and relay coil 42. A pilot lamp 48 is connected in parallel with relay coil 46. A 24 volt reed relay 50 has its relay coil 52 connected between the conductor 16 and the movable arm of contacts 461 of relay 44. The relay coil 52 controls a two position reed 521 connected to conductor 14 which normally makes contact with fixed contact 521a but may be actuated to make contact with fixed contact 521b. A solenoid coil 54 is connected in series with fixed contact 521b between conductors 14 and 16 and a lamp 56 is connected in parallel with it. Another lamp 58 is connected between the fixed contact 521a and conductor 16.

Figure 2:
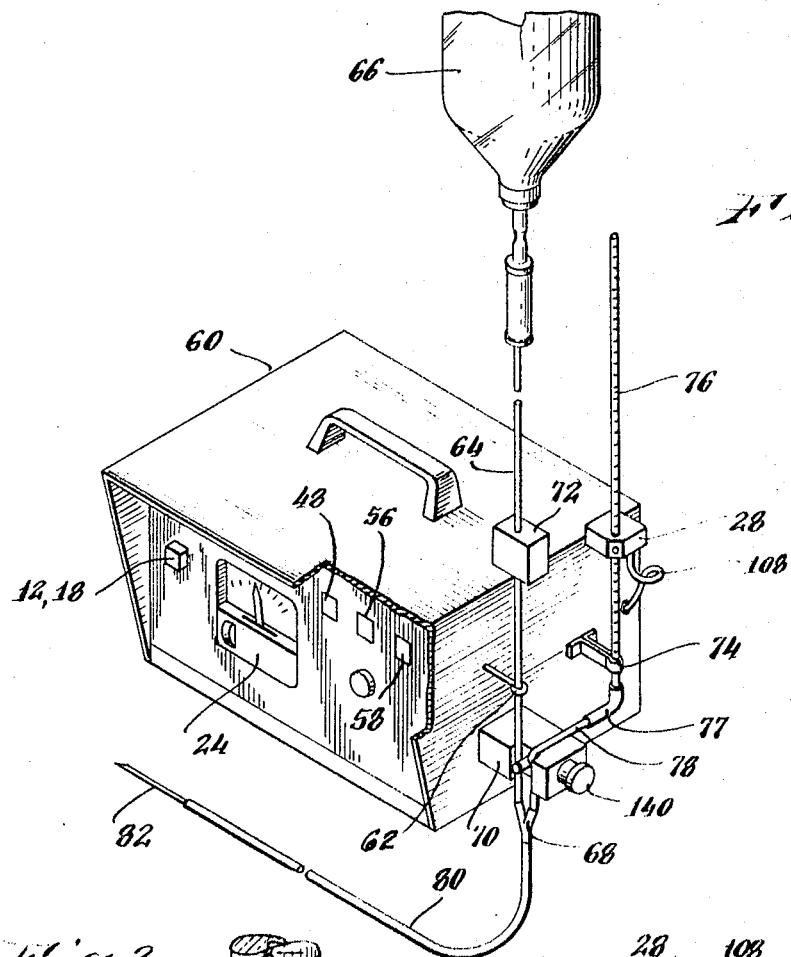
FIG. 2 is a perspective view of an apparatus in accordance with this invention.

Turning now to FIG. 2 there is illustrated the physical appearance of the infusion controller of this invention. It comprises a cabinet 60 which houses on its front panel the button for switch 12, illuminated from within by indicating lamp 18. Also mounted on this front panel are the face of cycle timer 24 and the three indicating lamps 48, 58 and 56. Mounted upon the end of the cabinet is an eye-hook tube guide 62 which positions a flexible plastic tubing 64 which extends from a standard infusion bottle 66 to a Y connector 68. The tubing 64 also passes through a valve head 70 which will shortly be described in more detail. A standard flow control valve 72 is also mounted on the tubing 64. A manometer holder 74 is also mounted on the end of cabinet 60 and supports therein a graduated manometer tube 76 upon which the sensor head 28 is positioned. The bottom of manometer tube 76 is connected by means of an L 77 and flexible plastic tubing 78 to another arm of the Y connector 68. Tubing 78 also passes through the valve head 70. The remaining arm of Y connector 68 is connected to a plastic tubing 80 which is provided at its end with a standard infusion needle 82.

Figure 3:
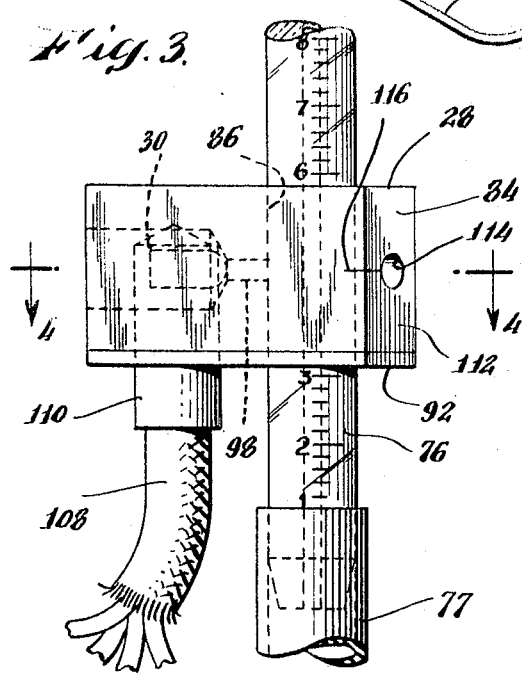
FIG. 3 is an enlarged detail of the sensor head assembly portion of the apparatus of FIG. 2.
Figure 4:
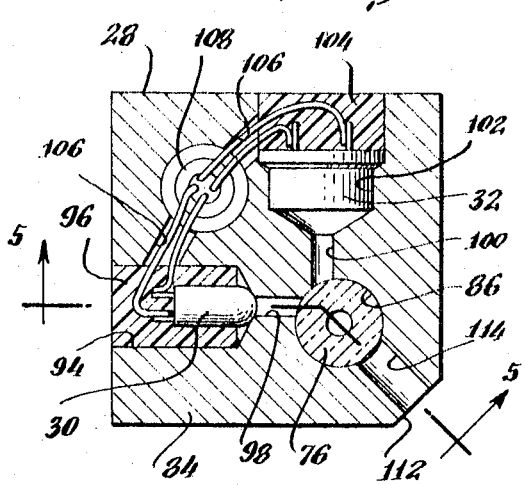
FIG. 4 is a cross section taken substantially along the line 4—4 of FIG. 3.

The sensor head is illustrated in more detail in FIGS. 3–5. The head comprises a body block 84 which is vertically drilled to provide a support passage 86 through which manometer tube 76 extends. A circular recess 88 surrounds the bottom of passage 86 and houses therein a resilient O-ring 90 which is retained by means of a lower plate 92. O-ring 90 grips the manometer tube 76 and holds the sensor head in a preselected position. A horizontally disposed chamber 94 in body 84 houses the lamp 30 which is encapsulated therein by means of a suitable encapsulating material 96. The chamber 94 communicates with the support passage 86 by means of a light passage 98. Another light passage 100 communicates between support passage 86 and a chamber 102 housing light sensitive resistor 32 which is also enclosed with a suitable encapsulating material 104. The leads from light 30 and resistor 32 pass through suitable openings 106 to a cable 108 secured to the block 84 by a cable support 110. One corner of the body block 84 is cut away to form a flat vertical surface 112 through which a viewing passage 114 extends to support passage 86. Adjacent the outer end of the viewing passage 114 is an index line 116 for aligning the sensor head 28 with the desired pressure reading on the manometer tube 76.

The valve head and solenoid assembly are illustrated in detail in FIGS. 6 and 7. The valve head 70 comprises an actuator body 118 which extends through the end of the cabinet and is mounted on suitable brackets 120, 122 to the interior of the cabinet and the solenoid coil 54. The solenoid coil encloses a plunger 124 which is split at its outer end and is secured by a connecting pin 126 to the end of an actuator shaft 128. The actuator shaft extends through a suitable guideway 130 in the actuator body 118. A coil spring 132 is mounted between the end of the solenoid coil 54 and a spring retainer 134 positioned against the connecting pin 126. Thus the plunger 124 and actuator shaft 128 tend to be maintained in their withdrawn position from solenoid 54 except when the solenoid coil is energized.

The actuator body 118 includes a vertical recess 136 along one side which communicates with the guideway 130. A valve pin 138 is threadedly mounted in the actuator shaft 128 and extends outwardly through the recess 136. The tubing 64 from the infusion bottle and the tubing 78 from the manometer tube pass through the recess 136 on opposite sides of the pin 138. It will thus be apparent that, when the solenoid is deenergized, the spring 132 will force the actuator shaft 128 and the pin 138 outwardly, pinching tube 78 closed while leaving tube 64 open. When the solenoid coil is energized, however, valve pin 138 is drawn inwardly, pinching tube 64 closed while opening tube 78. It will also be noted that a manual button 140 is formed on the outer end of actuator shaft 128.

Operation

To operate the infusion controller, the infusion bottle, tubing and manometer are positioned as illustrated, the button 140 being manually depressed to insert tubing 78. The flow control valve 72 is adjusted to its "off" position. The sensor head 28 is then positioned to the desired level by visual observation through viewing passage 114 against the graduations of the manometer tube. This may either be a maximum or minimum pressure reading but, for purposes of the present discussion, a maximum pressure reading will be assumed. If the patient's blood pressure reaches this level, it is desired that infusion stops. The cycle timer 24 is then set for the desired intervals at which the venous pressure will be checked. The tube 80 is then connected to the needle 82 and is inserted into the patient's body. The flow control valve 72 is adjusted to the desired flow and the button 140 is depressed halfway to fill the manometer tube. The power button 12 is then pushed to start the unit operating.

Turning now to FIG. 1, the contacts 261, 262 of cycle timer 24 will be open. The timing mechanism 26 of cycle timer 24 is energized through normally closed contacts 221 of time delay relay 20. Therefore the timer is operating. Contact 262 is in series with coil 52 of reed relay 50 through the contact 461 of time delay relay 44. Thus relay coil 52 is also deenergized. Solenoid 54, which is in series with the fixed contact 521b, is also deenergized so that the valve head 70 remains in the position illustrated in FIGS. 6 and 7 permitting fluid to flow from the infusion bottle through tubing 64 to the needle. It will also be noted that light 58 is energized through contacts 521 and 521a, thus indicating normal operation of the infusion function.

At preselected time intervals, the timing mechanism 26 will close the contacts 261, 262. The closing of contact 261 will energize the coil 22 of time delay relay 20 but its one-hundred-twenty second delay will prevent its immediate operation. Concurrently, the closing of contact 262 will energize relay coil 52 to actuate contact 521 against contact 521b, energizing the solenoid coil 54, turning off lamp 58, and lighting lamp 56, indicating operation of the checking function. Energization of solenoid 54 retracts the valve pin 138, shutting off infusion flow from the bottle and opening tube 78 between the patient and the manometer. The light sensitive resistor 32 is sensor head 28 has a low resistance under the influence of light. If the fluid in the manometer tube is below the preselected level, little light is reflected into light passage 100 and onto the light sensitive resistor 32. However, if infusion fluid rises in the manometer tube 76, the increased reflectivity at the interface between the fluid and the manometer tube 76 directs light through the light passage 100 and into the light sensitive resistor 32. For the present discussion, however, it will be assumed that the fluid has not reached such a level so that the resistance of resistor 32 remains high. This means that relay coil 36 remains deenergized and contacts 361, 362 remain in their illustrated positions. Accordingly, nothing further will take place in the circuit until the 120 seconds of time delay relay 20 have passed. Then, the contacts 221 will open, deenergizing timing mechanism 26 which thereupon resets itself to start a new timing period. Contacts 261 open, deenergizing relay coil 22 and permitting contacts 221 to reclose. Contacts 262 open, deenergizing relay coil 52 and causing contact 521 to reclose against contact 521a. This deenergizes solenoid 54, causing the valve to return to its infusion position. Lamp 56 is extinguished and lamp 58 goes on to indicate resumption of infusion.

Assume, now, that on the next checking cycle, the blood pressure has increased to the point that fluid in the manometer tube 76 causes light from lamp 30 to be reflected onto resistor 32, lowering its resistance. This energizes relay coil 36 and moves contacts 361, 362 against contacts 361b, 362b, respectively. The closing of contacts 362, 362b supplies power from conductor 14, through switch 38 and contacts 421 to the relay coil 46. However, as relay 44 has a 90 second time delay, its contacts do not move immediately from their illustrated positions. Lamp 48 is also lighted, indicating an abnormal pressure condition.

Digressing, briefly, it should be pointed out that it is undesirable to completely halt infusion for a prolonged period of time with the infusion needle in the vein. This is because the blood in the vicinity of the needle tip tends to clot. In order to prevent such clotting, the present apparatus is designed to periodically allow infusion for short time periods (for example, two seconds) during periods of abnormal pressure. This is the function of relays 44 and 40.

If the abnormal pressure continues, after 90 seconds, contacts 461 open and contacts 462 close. The opening of contacts 461 interrupts current flow to relay coil 52 and contact 521 moves against contact 521a, lighting lamp 58 and simultaneously deenergizing solenoid 54 and lamp 56. The deenergization of solenoid 54 returns the valve to its infusion position and fluid begins to flow into the vein.

The closing of contacts 462 energizes the coil 42 of the two second time delay relay 40. After the two second delay, contacts 421 open, deenergizing relay coil 46 and reenergizing relay coil 52 and solenoid 54 to move the valve back to its checking position. Simultaneously, contacts 462 open to deenergize relay coil 42 and the apparatus reverts to its standby condition with time delay relay 44 beginning another 90 second timing period.

If, at any time, the patient's blood pressure drops below the selected level, the relay coil 36 is deenergized and the normal infusion-checking cycle resumes.

Should it be desired to monitor a low blood pressure condition, this can be done by simply reversing switch 38. The sensor head 28 would then be adjusted to the minimum desired pressure. The operation of the apparatus would then be reversed, i.e., infusion will occur only when blood pressure is sufficiently high to ensure fluid in the sensor. Otherwise, the circuit will operate in an identical fashion and, accordingly, will not be described in detail inasmuch as the operation will be apparent from analysis of FIG. 1.

It will be readily apparent to those skilled in the art that a number of variations and modifications can be made in this invention without departing from its spirit and scope. For example, various types of pressure sensors may replace the manometer-optical sensor. Other variations and modifications will also suggest themselves to those skilled in the art. Accordingly, the foregoing is to be construed as illustrative only, rather than limiting. This invention is limited only by the scope of the following claims.

What we claim as new and desire to secure by Letters Patent of the United States is:

1. Venous fluid infusion apparatus which comprises: first conduit means for delivering an infusion fluid into a patient's body; second conduit means for delivering said fluid from a source thereof to said first conduit means; pressure sensing means; third conduit means for interconnecting said first conduit means and said pressure sensing means, all said conduit means being selectively in fluid communication with one another; valve means having a first position closing said third conduit means and opening said second conduit means and a second position closing said second conduit means and opening said third conduit means; timer means for periodically actuating said valve means to its second position at the end of a preselected timing interval; and control means responsive to said pressure sensing means for maintaining said valve means in its second position during continuation of a preselected pressure condition.

2. The apparatus of claim 1 wherein said pressure sensing means comprises a manometer tube and fluid level detection means associated therewith.

3. The apparatus of claim 2 wherein said detection means is adjustable relative to said manometer tube.

4. The apparatus of claim 2 wherein said fluid level detection means is optical.

5. The apparatus of claim 1 wherein said control means includes cyclical anti-clotting means for actuating said valve means to its first position for short periods during continuation of said preselected pressure condition.

6. The apparatus of claim 5 wherein said anti-clotting means comprises: first time delay relay means for establishing an anti-clotting flow interval; and second time delay relay means for establishing an anti-clotting flow period.

7. The apparatus of claim 6 wherein operation of said second time delay relay means deenergizes said first time delay relay means.

8. The apparatus of claim 1 wherein at least a portion of each of said second and third conduit means comprises a flexible tube portion and wherein said valve means comprises a movable member arranged to pinch one or the other of said flexible tube portions to its closed position.

9. The apparatus of claim 8 wherein said movable member is actuated by the armature of a solenoid.

10. The apparatus of claim 1 wherein means is provided for resetting said timer means at the end of a preselected checking interval.

References Cited
UNITED STATES PATENTS

| | | | |
|---|---|---|---|
| 2,600,324 | 6/1952 | Rappaport | 128—2.05 X |
| 2,626,446 | 1/1953 | Moore | 27—24 |
| 2,835,252 | 5/1958 | Mauchel | 128—214 |
| 3,124,133 | 3/1964 | Marbach | 128—214 |
| 3,163,176 | 12/1964 | Darling | 137—287.5 |
| 3,185,153 | 5/1965 | Leucci | 128—227 |
| 3,252,623 | 5/1966 | Corbin et al. | 222—59 |
| 3,419,945 | 1/1969 | Sawyer | 27—24 |

DALTON L. TRULUCK, Primary Examiner

U.S. Cl. X.R.

27—24; 128—2.05, 227; 137—287.5; 222—52